A. P. BRUSH.
AUTOMOBILE BODY.
APPLICATION FILED MAR. 21, 1912.
1,091,187.
Patented Mar. 24, 1914.
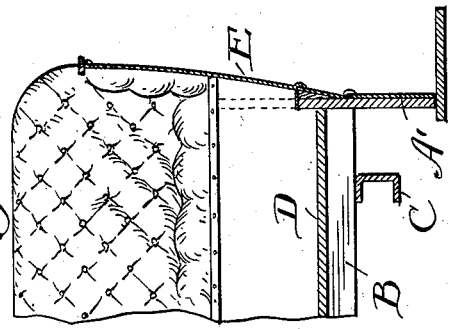
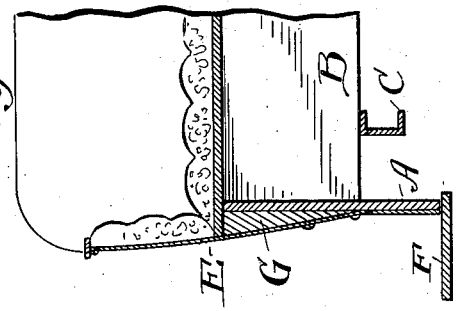
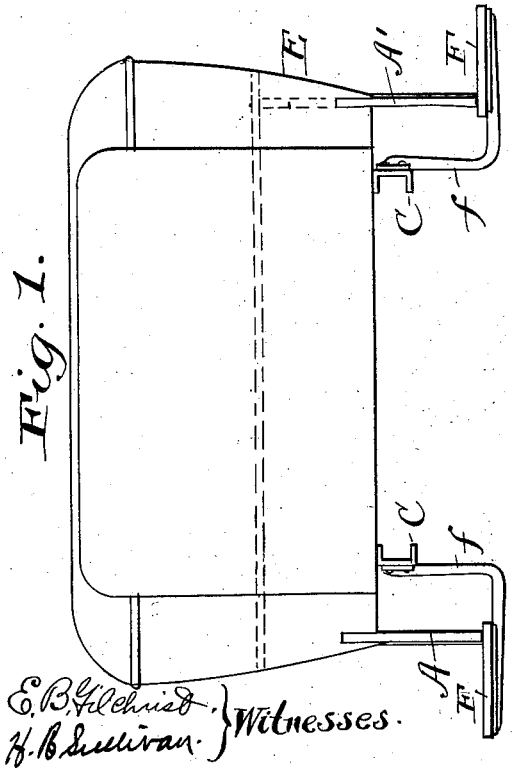
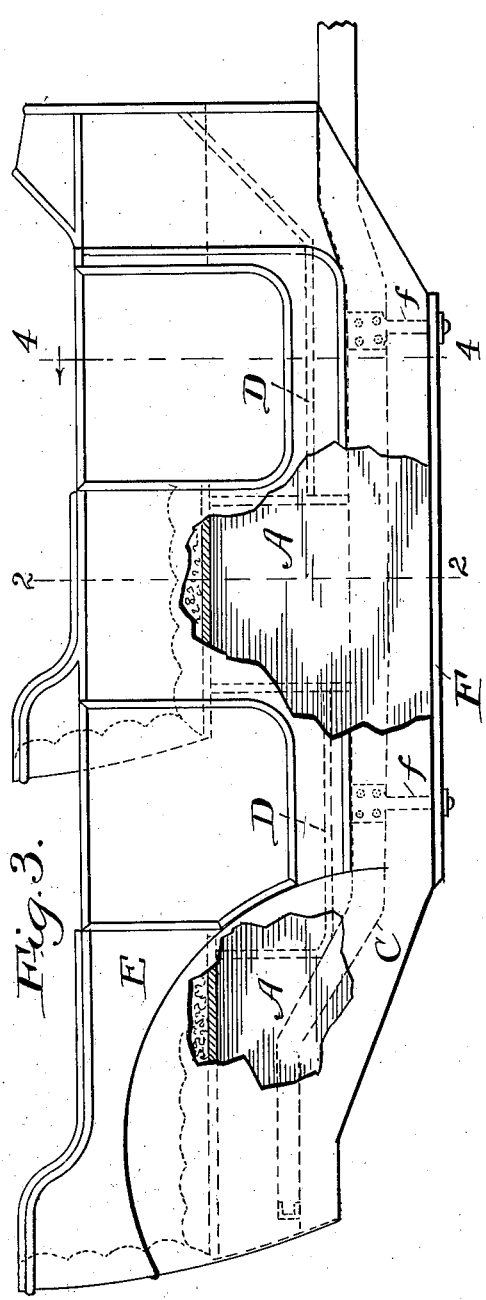

UNITED STATES PATENT OFFICE.

ALANSON P. BRUSH, OF DETROIT, MICHIGAN.

AUTOMOBILE-BODY.

1,091,187.   Specification of Letters Patent.   Patented Mar. 24, 1914.

Application filed March 21, 1912. Serial No. 685,238.

*To all whom it may concern:*

Be it known that I, ALANSON P. BRUSH, a citizen of the United States, residing at Detroit, in the county of Wayne and State of Michigan, have invented a certain new and useful Improvement in Automobile-Bodies, of which the following is a full, clear, and exact description.

It is common practice in automobile construction to support the passenger carrying portion or body of an automobile by letting the lower edges of the sides or side sills of the body rest upon the top of the automobile frame, or upon brackets or other devices secured to said frame,—the body being, of course, attached to the frame or brackets as the case may be. It is also common and desirable practice to build automobile bodies wider than the automobile frames on which they are supported. It is now considered desirable that the floors of the bodies, as well as all of the automobile mechanism shall be as low as is consistent with proper ground clearance. It is also common and desirable practice to provide door openings in the sides of said bodies, the lower edges of said door openings being substantially coincident with the floor level.

In order to provide and use bodies which are wider than the automobile frames on which they are supported and which set low, and which have deep door openings, it has come to be the custom to build the bodies with heavy longitudinally extended side sills which are strong enough to compensate for the weakening effect of the deep door openings, and which are wide enough to reach inward to the automobile frame members on which said sills are to rest in order to properly support the body. The use of these heavy wide sills to give the necessary strength makes the bodies unduly heavy and undesirably expensive.

The object of this invention is to provide lighter and cheaper automobile bodies which, however, are sufficiently strong, and which have all of the desirable qualities and characteristics above pointed out.

The invention consists of an automobile body which is wider than the automobile frame on which it is supported,—whose floor is low, *i. e.* just above the top of the automobile frame, and which has door openings which extend from the top edge of the sides down to as near the floor level as is desirable, and which has its side members extended down a considerable distance below the floor level outside of the supporting automobile frame,—said downward extensions giving to the body a deep beam construction which makes the body sufficiently strong, even if the door openings be carried down to a plane which would entirely divide the ordinary body construction. These downward extensions of the side members also serve the same purpose as, and therefore render it unnecessary to additionally employ, the sheet metal or leather panels which it is customary to secure to the automobile frame and to extend down to the running board.

In the drawing, Figure 1 is a front elevation of an automobile body constructed according to this invention, and the automobile frame on which it is supported. Fig. 2 is a sectional view in the plane of line 2—2 on Fig. 3; and Fig. 3 is a side elevation partly broken away. Fig. 4 is a sectional view in the plane of line 4—4 on Fig. 3.

Referring to the parts by letters, A, A' represent the sides of the automobile body.

B, B' represent transverse members which are suitably connected with the sides, and are constructed so that their lower edges will rest upon and may be secured to the automobile frame C or suitable brackets secured thereto. These transverse members in some form or another are necessary, or, at least, are desirable for supporting the seats, but they have not heretofore been utilized as the means whereby the body is supported.

D represents the floor which extends over the automobile frame C,—its lower surface being substantially flush with the upper edges of these transverse members. It will be noted that the sides A, A' are extended downward a considerable distance below this floor. How far above the floor level these beam-like sides will be extended is a matter of choice; but they must extend some distance up, and they preferably extend up to the tops of the transverse members. Since the body is wider than the automobile frame C which supports it, these downwardly extended parts of the sides lie outside of the frame. They preferably extend down so far that their lower edges either rest upon or lap past the running board F. This running board is always supported upon brackets *f* secured to the automobile frame; and it has been customary to employ panels of thin sheet metal or leather or some other material which are connected usually with the automobile frame to close up the space between the bottom edge of the body and the running board to prevent splashing of mud or water and to likewise improve the appearance of the vehicle. These downwardly extended parts of the side members of the body serve this purpose, making the use of such panels unnecessary. Additionally, these side members function like, and, in fact, are deep beams which impart the required rigidity and strength to the side members of the frame, even though the door openings are cut down quite to the floor level, as shown. The side sills may be wholly dispensed with. These beam-like downwardly extended side members of the body may or may not be integral with the exposed upper parts or panels thereof, although probably it would not be practical to make them integral. These panels are sometimes built up out of wood. Sometimes they are made of sheet metal, and have a great variety of curves in them to enhance their appearance. In the preferred construction there will be a plurality of vertical bars G which will be connected with the side body members A, A'; and the outer exposed upper part or paneling E of the body will be connected with the body side members A, A' by means of such bars G. These same upright bars may serve as the means whereby the transverse weight supporting body members B, B, are connected with the side members A, A'. And they may also serve as the side posts of the doors which will be provided for closing the door openings.

Having described my invention, I claim:

1. In an automobile, the combination of an automobile frame, and an automobile body which is wider than said frame, said body comprising side members which lie outside of and extend below the top of said frame and have door openings which extend from their top edges downward to a plane which is above the top of said frame, and transverse members which are connected with said side members and which extend across and rest upon said frame.

2. In an automobile, the combination of an automobile frame, and an automobile body which is wider than said frame, said body comprising side members which lie outside of and extend below the top of said frame and have door openings which extend from their top edges downward to a plane which is above the top of said frame, and means extending inward from said side members for connecting them to said frame.

3. In an automobile, the combination of an automobile frame, and an automobile body which is wider than said frame, said body comprising side members which lie outside of and extend below said frame and have door openings which extend from their top edges downward, transverse members which are connected with said side members and which extend across and rest upon said frame, and vertical members which serve to connect the side members and transverse members.

4. In an automobile, the combination of an automobile frame, brackets secured thereto, and running boards on both sides of the frame secured to said brackets, with a body which is wider than said frame said body comprising side members which lie outside of the frame, and extend below it down to said running board, and transverse members which are connected with said side members and which extend over and rest upon said frame.

In testimony whereof, I hereunto affix my signature in the presence of two witnesses.

ALANSON P. BRUSH.

Witnesses:
E. L. THURSTON,
H. R. SULLIVAN.